United States Patent [19]

Simonds

[11] 4,178,659
[45] Dec. 18, 1979

[54] TRANSFER APPARATUS FOR POULTRY PROCESSING CONVEYOR

[75] Inventor: Michael E. Simonds, Gainesville, Ga.
[73] Assignee: Stork Gamco, Inc., Gainesville, Ga.
[21] Appl. No.: 847,086
[22] Filed: Oct. 31, 1977
[51] Int. Cl.² .............................................. A22B 5/00
[52] U.S. Cl. ........................................ 17/24; 17/44.1;
198/480; 198/680
[58] Field of Search ............... 198/477, 480, 482, 483, 198/484, 678, 685, 686, 680; 17/11, 44.1, 44.2, 24; 214/1 BA

[56] References Cited
U.S. PATENT DOCUMENTS

| | | | |
|---|---|---|---|
| 2,634,737 | 4/1953 | Rowe .................................... | 198/480 |
| 3,058,604 | 10/1962 | Harper et al. ......................... | 198/477 |
| 3,643,293 | 2/1972 | Rejsa et al. ........................... | 198/477 |
| 4,034,440 | 7/1977 | van Mil ................................. | 17/11 |
| 4,071,924 | 2/1978 | Meyn ..................................... | 17/44.1 |

Primary Examiner—Robert B. Reeves
Assistant Examiner—Douglas D. Watts
Attorney, Agent, or Firm—Newton, Hopkins & Ormsby

[57] ABSTRACT

Suspended birds traveling in one direction on a linear delivery conveyor are transferred to a parallel oppositely moving receiver linear conveyor by an intervening rotary transfer conveyor and coacting stationary bird camming bars which nudge the birds from shackles on the delivery conveyor to shackles on the rotary transfer conveyor and from the latter shackles to shackles on the receiving conveyor. Simplicity of construction and positive reliable operation are featured.

10 Claims, 4 Drawing Figures

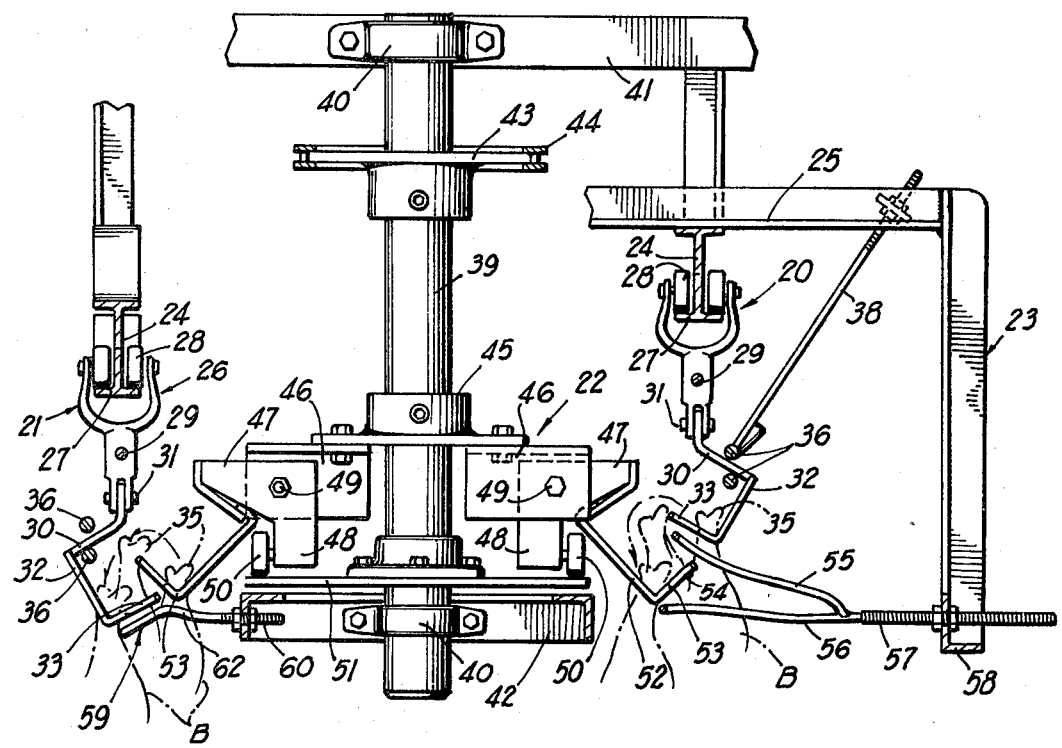
FIG 2
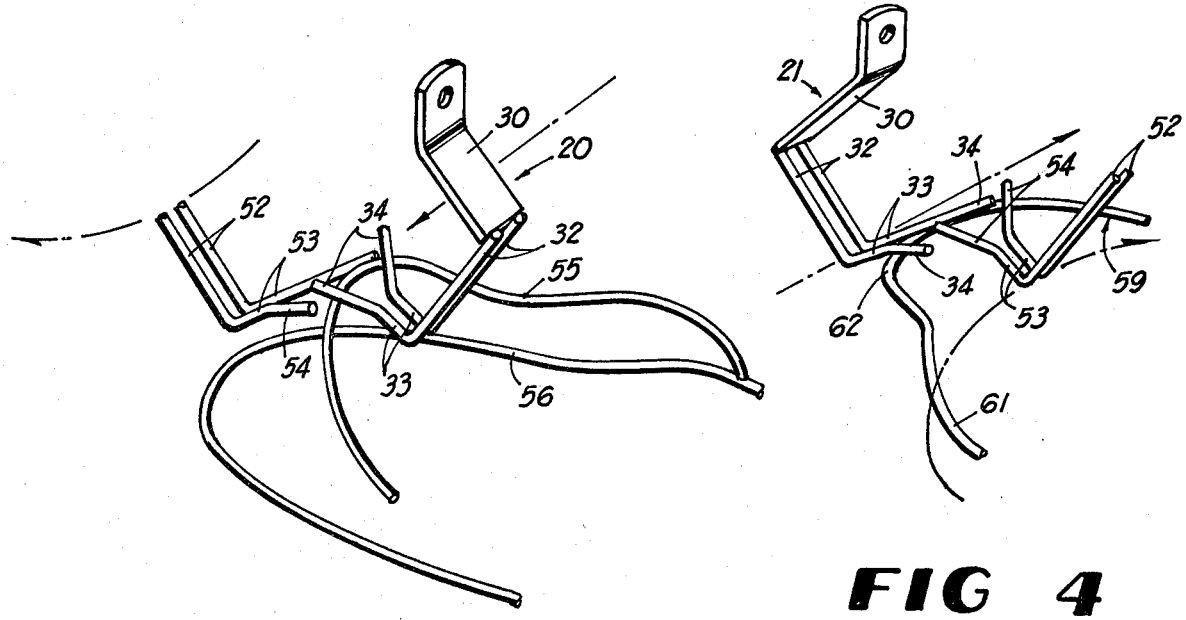
FIG 3
FIG 4

TRANSFER APPARATUS FOR POULTRY PROCESSING CONVEYOR

BACKGROUND OF THE INVENTION

In the processing of poultry commercially on a high volume basis, the necessity for transferring birds from one linear conveyor to another where different processing steps, such as picking and eviscerating, are performed is well known.

The objective of the invention is to provide a poultry transfer apparatus which fulfills this requirement in a much more efficient, economical and reliable manner than in the past by known prior art devices.

The patented prior art along the general lines of the invention is exemplified by U.S. Pat. No. 3,643,293.

A secondary objective of the invention is to provide a transfer apparatus which requires only a few basic adjustments which are made at the time of installation and which require very infrequent changing during the operation of the apparatus.

SUMMARY OF THE INVENTION

Essentially, the invention embodies a supporting framework for spaced parallel oppositely traveling linear conveyors, each having a plurality of equidistantly spaced shackles equipped with poultry suspension rods. A vertical axis rotary transfer conveyor with circumferentially equidistantly spaced shackles is supported between the two linear conveyors and the speeds of the three conveyors are timed to provide substantially zero relative movements between the rotary transfer shackles and the shackles on the two linear conveyors at the instants of bird transfer from the delivery conveyor to the transfer conveyor and from the latter to the receiving conveyor. Very important in the two transfer operations are relatively stationary camming bars which engage each bird in succession on the delivery conveyor and nudge or cam it out of engagement with suspension rods of shackles on the delivery conveyor and into suspension rods of shackles on the rotary transfer conveyor, and from the latter rods into the suspension rods of shackles on the linear receiving conveyor.

BRIEF DESCRIPTION OF THE DRAWINGS

FIG. 2 is a transverse vertical section taken substantially on line 2—2 of FIG. 1.

FIG. 3 is a fragmentary perspective view of shackles on the linear delivery conveyor and rotary transfer conveyor with coacting camming bars.

FIG. 4 is a similar view of shackles on the transfer and receiving conveyors with coacting stationary camming bar.

DETAILED DESCRIPTION

Figure 1:
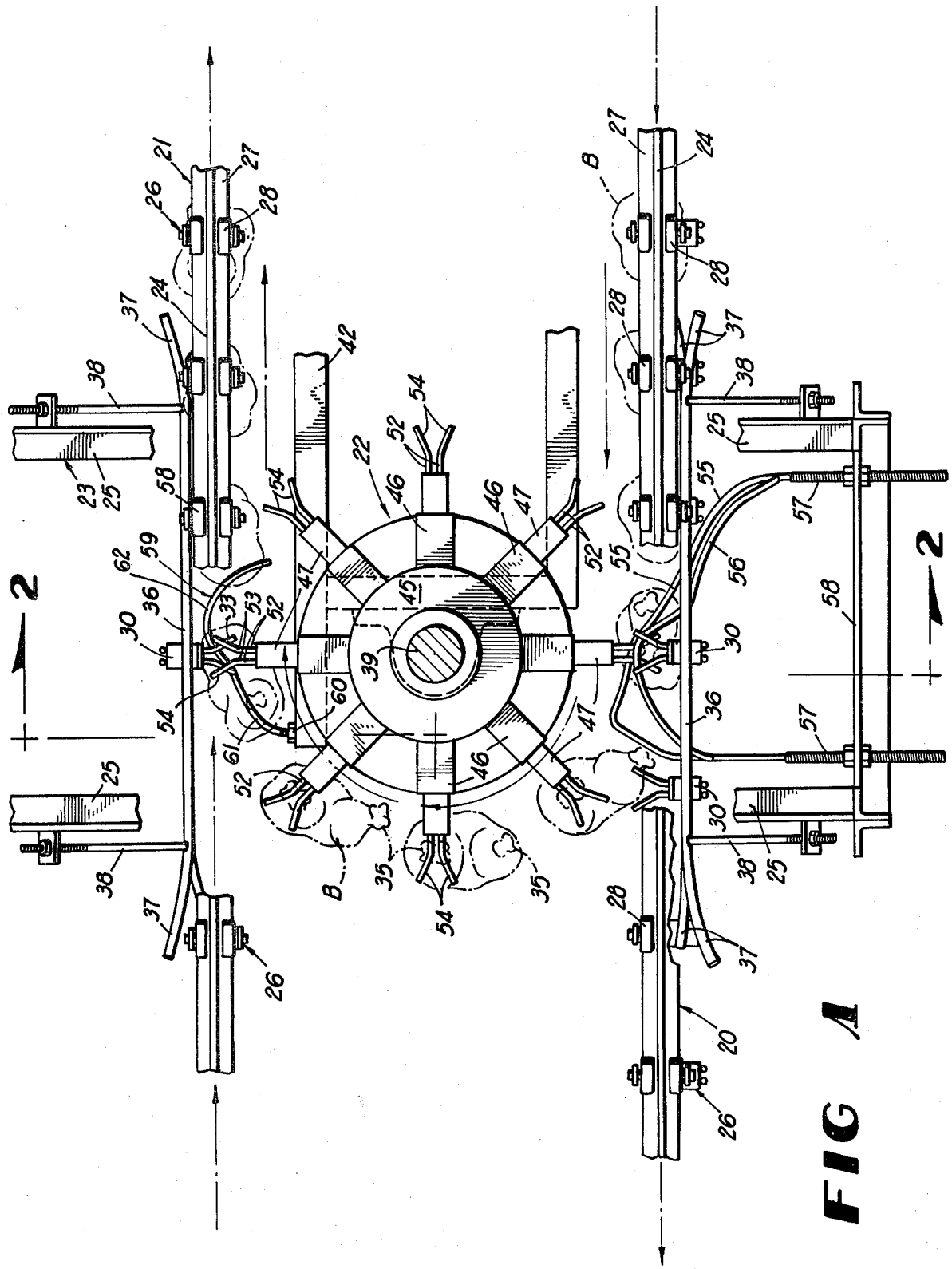
FIG. 1 is a plan view of the invention, partly broken away and partly in section.

Referring to the drawings in detail wherein like numerals designate like parts, a transfer apparatus embodying the invention comprises in terms of basic components a linear delivery conveyor 20 for poultry units or like products and a parallel receiving conveyor 21 spaced from the delivery conveyor and moving oppositely to the delivery conveyor at the same linear speed as the delivery conveyor. The linear conveyors 20 and 21 are intervened by a vertical axis rotary transfer conveyor 22 whose speed of rotation is such that during transfer of birds to and from shackles of the rotary conveyor there is essentially a zero relative movement between the shackles of the rotary conveyor and those of the two linear conveyors. As shown in FIG. 2, the delivery conveyor 20 is at an elevation somewhat above that of the receiving conveyor 21.

More particularly, the transfer apparatus comprises a stationary rigid frame 23 for the support of the two linear conveyors 20 and 21 and the rotary transfer conveyor 22. A pair of parallel I-beam tracks 24 for conveyors 20 and 21 are supported rigidly on frame bars 25, and a plurality of longitudinally equidistantly spaced shackles 26 are suspended from the bottom horizontal webs 27 of tracks 24 by ball bearing rollers 28. The shackles 26 are connected in series by linear drive cables 29 driven in opposite directions on the two conveyors 20 and 21 in any conventional manner, not shown.

Each suspended shackle 26 on delivery conveyor 20 and receiving conveyor 21 has an inclined shackle plate 30 pivoted thereto at 31 and rigidly connected to the lower end of each shackle plate 30 at right angles thereto are a pair of spaced parallel shackle arms or rods 32, in turn having integral right angular spaced rod extensions 33 with divergent end portions 34 for the suspension of birds B by their hocks 35, the legs of the birds beneath their hocks entering between the suspension rod extensions 33 of the shackles 26. The rod extensions 33 are also inclined during movement with the conveyors 20 and 21 as shown in FIG. 2. The rod extensions 33 of the delivery conveyor 20 are in opposing relationship to the extensions 33 of receiving conveyor 21 and are at a higher elevation than the latter, FIG. 2.

In the transfer zone of the apparatus adjacent to the rotary conveyor 22, a pair of guidance and stabilizer rods 36 for the respective inclined shackle plates 30 are arranged immediately above and below these plates in parallel spaced relationship. The horizontal rods or bars 36 have divergent end portions 37 for ease of entry of the shackle plates 30 therebetween. The guidance and stabilizing rods 36 are supported adjustably from the overhead frame members 25 by preferably screw-threaded adjusting supports 38.

The elements 36 prevent any appreciable swaying of the shackle plates 30 when they are in the critical transfer region of the rotary transfer conveyor 22.

The rotary transfer conveyor 22 comprises a vertical drive shaft 39 disposed midway between the linear conveyors 20 and 21 at right angles to the horizontal tracks 24. The shaft 39 is journaled in spaced bearings 40 on upper and lower frame members 41 and 42 forming parts of the frame 23. The shaft 39 is driven rotationally by a sprocket gear 43 secured thereto and engaged by a sprocket chain 44, in turn powered by a suitable power take-off shaft, not shown.

Fixed on the shaft 39 in the vicinity of the shackles 26 by a collar 45 are transfer shackle brackets 46 in the form of angle members which are circumferentially equidistantly spaced around the collar 45, as shown in FIG. 1. Radial transfer shackle bodies 47 having depending legs 48 are pivotally mounted at 49 on the brackets 46. The legs 48 are equipped with rollers 50 which contact a horizontal stationary bed plate 51 attached to the frame 23.

The radial rotating shackle bodies 47 carry pairs of spaced inclined shackle suspension rods 52 suitably fixed thereto and these rods have right angular upturned inclined extensions 53 which diverge at 54 for guidance of bird legs therebetween during the transfer operation. As shown in FIG. 2, the shackle rods 52 are inclined and diverge downwardly from the shackle brackets 46 and extend outwardly from the bed plate 51. Due to the difference in elevation of the shackles 26 on the two linear conveyors 20 and 21, the rod extensions 53 lie below the rods 33 on delivery conveyor 20 and extend above the corresponding rods 33 on receiving conveyor 21, which arrangements are also shown in FIGS. 3 and 4.

A very important aspect of the invention resides in the provision of relatively stationary camming means on the frame 23 at the points where the birds B are transferred in succession from the delivery conveyor 20 to the rotary conveyor 22 and from the latter to the receiving conveyor 21. At these transfer points shown in FIG. 1 on diametrically opposite sides of the rotary conveyor 22, shackles of the rotary conveyor including the rod extensions 53 move adjacent to a pair of the oppositely moving suspended shackles 26 on linear conveyors 20 and 21. Due to proper timing of the three conveyor means, the coacting pairs of shackles on the linear and rotary conveyors at the two transfer points have no relative movement at the moment of transfer. It is at these two points and at this critical moment that the above-mentioned stationary camming means comes into play to assure an unfailing transfer of each bird B from the conveyor 20 to the rotary transfer conveyor 22, and simultaneously, at a diametrically opposite point, from the latter to the receiving conveyor 21.

More particularly, the transfer camming means associated with the delivery conveyor 20 and rotary conveyor 22 comprises a pair of spaced somewhat divergent compound curved cam bars 55 and 56 whose terminal ends are secured adjustably by screw-threaded means 57 to a member 58 of the apparatus frame 23. At the time of transfer of a bird from the conveyor 20 to the rotary conveyor 22, as discussed above, the bar 55 cammingly engages a portion of the bird leg below the hock 35 and forces the suspended bird inwardly and upwardly on the inclined rod extensions 33. At the completion of this camming action by the bar 55, the bird will move into engagement with the inclined rod extensions 53 of the adjacent rotary shackle on the conveyor 22 and gravity will assist the final transference of the bird from the rods 33-34 to the rods 53-54, as illustrated by the arrow in FIG. 2. The lateral spacing of the pairs of rods 33 and 53 is such that the hocks 35 cannot escape from the rods and the bird is safely suspended at all times.

Acting in concert with the cam bar 55, the second cam bar 56 disposed in a plane slightly below the rods 52-53 engages each bird leg below the hock 35 to assure that the leg is forced downwardly into the right angular corner formed between the rods 52 and 53 and this completes the transfer of the bird from the conveyor 20 to the conveyor 22. The process is repeated in the same manner for each oncoming bird B on the delivery conveyor 20 and at such times, the two camming bars 55 and 56 function in exactly the manner described above with additional coacting pairs of shackles 26 and 47 on the conveyors 20 and 22.

The camming means utilized at the transfer point between conveyors 22 and 21 consists of a single compound curved camming bar 59 fixed adjustably at 60 to frame part 42. The camming bar 59 has a first curved portion 61 that makes initial contact with a bird leg slightly below the hock 35 and begins to urge the leg radially outwardly of its orbital path on the conveyor 22 while suspended by the rods 32-33. Upon reaching alignment with an oncoming shackle 26 of receiving conveyor 21, a second and more acutely curved section 62 of the camming bar 59 completely dislodges the bird from rods 53-54 and the bird, by gravity, completes its transference into the rods 32-33 of the shackle 26 on conveyor 21, as indicated by the arrow in FIG. 2. It should be noted that 180 degrees of rotation of the conveyor 22 is utilized to transport birds from the conveyor 20 to the conveyor 21 and the remaining 180 degrees of movement is utilized to recycle the rotating shackles back to the delivery conveyor 20 to receive additional birds therefrom. The operation of the apparatus is continuous and automatic. The receiving conveyor 21 transports the birds which it receives on to further processing stations forming no part of this invention.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A transfer apparatus comprising spaced oppositely moving conveyors each having a line of spaced article carriers, an intervening rotary transfer conveyor having spaced article carriers arranged to coact in succession with article carriers on the oppositely moving conveyors, and relatively stationary cam means adjacent to article transfer points between the oppositely moving and rotary transfer conveyors and engageable with articles at the transfer points to force them from the article carriers of one first-named conveyor to the article carriers of the rotary transfer conveyor and from the article carriers of the latter to the article carriers of the other of said first-named oppositely moving conveyors, and said oppositely moving conveyors comprising a pair of substantially parallel linear conveyors disposed at different elevations relative to said rotary transfer conveyor, and said line of spaced article carriers on each oppositely moving linear conveyor including a plurality of equidistantly spaced article suspension shackles, said rotary transfer conveyor having plural circumferentially equidistantly spaced article suspension shackles adapted to register in succession with the shackles of the linear conveyors at two diametrically opposite article transfer points on said apparatus.

2. A transfer apparatus as defined in claim 1, and the shackles of one linear conveyor being above the shackles of the rotary transfer conveyor, the shackles of the other linear conveyor being at least partially below the shackles of the rotary transfer conveyor, the latter shackles all being disposed at one elevation.

3. A transfer apparatus as defined in claim 1, and said cam means comprising curved cam bars at said article transfer points which act on articles at the transfer points while pairs of coacting article carriers of the oppositely moving and rotary transfer conveyors are in registration at said transfer points.

4. A transfer apparatus as defined in claim 1, and all of said suspension shackles having depending laterally spaced suspension rods of generally right angular formation in profile to form on the pairs of rods bottom suspension corners for conveyed articles.

5. A transfer apparatus as defined in claim 2, and said cam means comprising curved cam rods adjacent said article transfer points engaging articles on the linear conveyor at the highest elevation and forcing such articles to disengage the shackles of such linear conveyor for gravitation into shackles of the rotary transfer conveyor and for also engaging articles in the shackles of the rotary transfer conveyor and disengaging the articles from such shackles and causing them to gravitate into shackles of the other linear conveyor.

6. A transfer apparatus as defined in claim 5, and said cam means at one article transfer point comprising a pair of spaced compound curved cam rods at two different elevations relative to said shackles of the linear and rotary transfer conveyors, said cam means at the other diametrically opposite transfer point comprising a single compound curved cam rod at a fixed elevation relative to and below said shackles.

7. A transfer apparatus as defined in claim 6, and said pair of cam rods at two different elevations being disposed at the article transfer point at which the adjacent linear conveyor is at a greater elevation relative to the rotary transfer conveyor than the other linear conveyor.

8. A transfer apparatus as defined in claim 3, and means to mount the curved cam bars adjustably at the article transfer points.

9. A transfer apparatus as defined in claim 8, and said adjustment means comprising horizontal axis means which is transverse to the lines of movement of said oppositely moving conveyors.

10. A transfer apparatus comprising spaced oppositely moving substantially parallel linear conveyors disposed at two different elevations, equidistantly spaced article suspension shackles on each oppositely moving linear conveyor and also being at different elevations on the two linear conveyors but at one elevation on each such conveyor, an intervening rotary transfer conveyor substantially midway between the linear conveyors and having circumferentially equidistantly spaced article suspsension shackles at a common elevation and between the two elevations of the shackles of said oppositely moving linear conveyors, the shackles of the rotary transfer conveyor adapted to register in succession with shackles of the linear conveyors at two diametrically opposite article transfer points, and relatively stationary camming means on the apparatus at said transfer points and engaging articles at the transfer points to lift the articles from the shackles of one linear conveyor so that the articles may drop into supportive engagement with the shackles of the rotary transfer conveyor and to also lift the articles from the shackles of the rotary transfer conveyor so that the articles may drop into supportive engagement with the shackles of the other linear conveyor.

* * * * *